(No Model.)
T. C. BUTLER.
NUT LOCK.
No. 516,563. Patented Mar. 13, 1894.
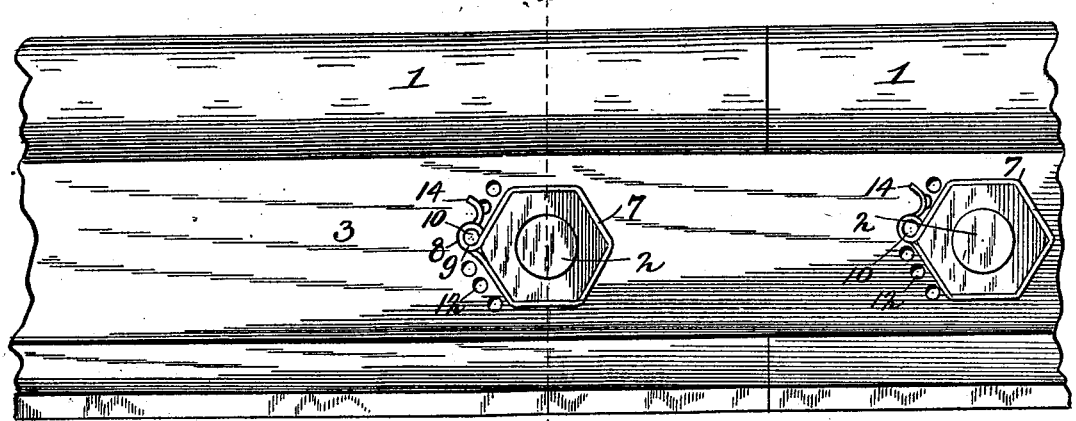
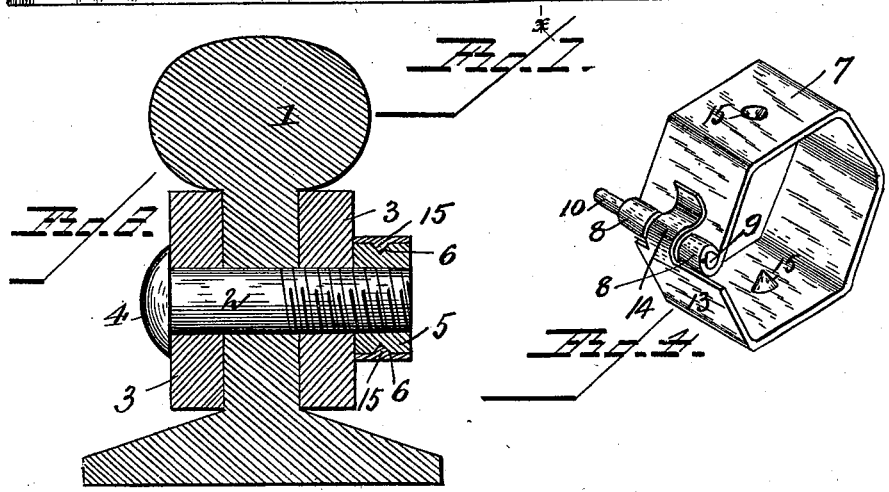
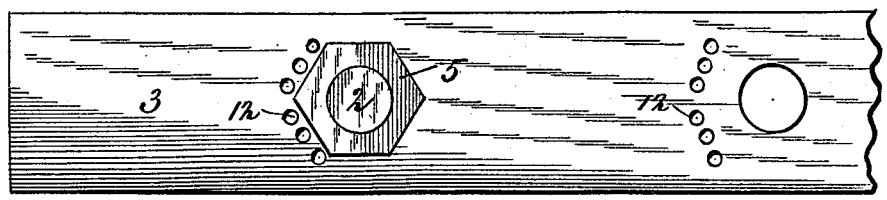
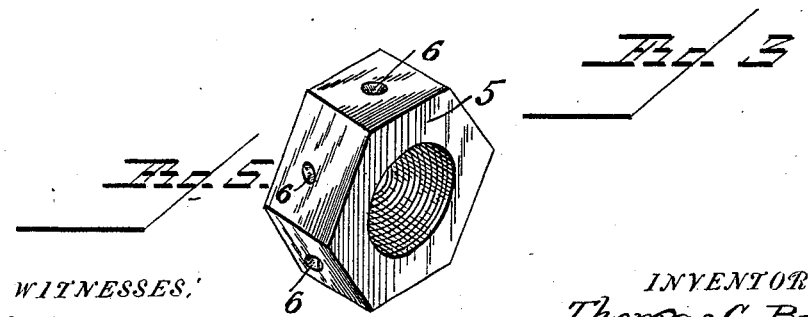
WITNESSES:
F. L. Ourand.
B. L. Coombs.
INVENTOR:
Thomas C. Butler,
By Laws Dagger &Co.
Attorneys.
THE NATIONAL LITHOGRAPHING COMPANY,
WASHINGTON, D. C.

UNITED STATES PATENT OFFICE.

THOMAS C. BUTLER, OF MYSTIC, IOWA, ASSIGNOR OF ONE-HALF TO ALEXANDER ORR, OF SAME PLACE.

NUT-LOCK.

SPECIFICATION forming part of Letters Patent No. 516,563, dated March 13, 1894.

Application filed December 8, 1893. Serial No. 493,193. (No model.)

*To all whom it may concern:*

Be it known that I, THOMAS C. BUTLER, a citizen of the United States, and a resident of Mystic, in the county of Appanoose and State of Iowa, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification.

My invention relates to improvements in nut locks, principally designed for use in connection with rail road rails, whereby accidental disengagement of the nut due to the vibration of the rails is prevented, yet at the same time allowing the nut to be readily removed when required.

While the invention is more especially designed for rail road rails, it may be used generally whenever it is desirable to lock the nut upon the bolt.

The invention consists in the novel construction and combination of parts hereinafter fully described and claimed.

In the accompanying drawings: Figure 1 is a side view of a nut lock constructed in accordance with my invention, showing the same used for connecting rail road rails together. Fig. 2 is a transverse sectional view on the line $x$—$x$, Fig. 1. Fig. 3 is a side view of the fish plate and nut, the locking band being removed. Fig. 4 is a perspective view of the locking band detached. Fig. 5 is a similar view of the nut.

In the said drawings the reference numeral 1 designates two ordinary rail road rails, formed with apertures near each end for the passage of the bolts 2, which may be of any ordinary construction.

The numeral 3 designates the fish plates, having apertures registering with the apertures in the rails through which the bolts also pass. These bolts are of any ordinary construction being formed from a short cylindrical metal rod having a head 4, at one end and screw threaded at the other.

The numeral 5 designates the nut, being shown in the present instance as being hexagonal, or having six sides, although it may be made square or of any other angular form desired. Each of the sides of the nut is formed with a recess or depression 6, for a purpose hereinafter explained.

The numeral 7 designates the locking band consisting of a sheet metal plate, bent into a form corresponding to that of the nut. At one end this band is cut away or recessed at the center forming two short arms 8, which are bent over forming loops 9, which clamp and securely hold a pin 10, one end of which projects beyond the side edge of the band and is adapted to engage with one of a series of holes 12, in the fish plate 3. The other end of the band is cut away at each side forming a short arm 13, which is bent outwardly at 14, forming a catch adapted to engage with the pin 10. The locking band is also formed on its inner side with a series of lugs or projections 15 adapted to engage with the depressions in the sides of the nut.

The operation will be readily understood. The fish plates are applied to the sides of the adjoining rails, and the bolts passed through the apertures therein. The nuts are then applied to the screw threaded ends of the bolts and screwed home. The band is then placed around the nut, the projections 15, engaging with the depressions in the sides of the nut and the pin 10 inserted in one of the holes in the fish plate. The spring catch 14 is then engaged with the pin 10, when the nut will be securely locked and accidental disengagement of the same from the bolt prevented.

Having thus described my invention, what I claim is—

The combination with the fish plate having a bolt aperture and a series of holes for the pin of the locking band, the screw threaded bolt, and the nut having a series of depressions on its sides, of the locking band consisting of a spring metal plate corresponding in shape with the nut and having a series of projections engaging with said depressions, the pin connected with one end of said band and adapted to engage with the holes in the fish plate, and the spring catch on the other end of said band engaging with said pin; substantially as described.

In testimony that I claim the foregoing as my own I have hereunto affixed my signature in presence of two witnesses.

THOMAS C. BUTLER.

Witnesses:
 HENRY MCVEIGH,
 CHARLEY W. KINGSBURY.